United States Patent
Athelogou et al.

(10) Patent No.: US 7,523,079 B2
(45) Date of Patent: Apr. 21, 2009

(54) SITUATION DEPENDENT OPERATION OF A SEMANTIC NETWORK MACHINE

(75) Inventors: Maria Athelogou, Munich (DE); Konstantinos Bobolas, Munich (DE); Renate Binnig, Kottgeisering (DE); Peter Eschenbacher, Altomünster (DE); Guenter Schmidt, Munich (DE)

(73) Assignee: Definiens AG, Munich (DE)

( * ) Notice: Subject to any disclaimer, the term of this patent is extended or adjusted under 35 U.S.C. 154(b) by 446 days.

(21) Appl. No.: 11/414,000

(22) Filed: Apr. 28, 2006

(65) Prior Publication Data

US 2006/0195407 A1 Aug. 31, 2006

Related U.S. Application Data

(63) Continuation-in-part of application No. 10/031,243, filed as application No. PCT/EP00/03540 on Apr. 18, 2000, now abandoned.

(30) Foreign Application Priority Data

Apr. 19, 1999 (DE) .................. 199 17 592

(51) Int. Cl.
 *G06F 15/18* (2006.01)
(52) U.S. Cl. .................................... 706/12; 707/101
(58) Field of Classification Search ............... 706/12; 707/101
 See application file for complete search history.

(56) References Cited

U.S. PATENT DOCUMENTS 4,815,005 A  3/1989 Oyanagi et al. ............ 364/513

(Continued)

FOREIGN PATENT DOCUMENTS

DE  19908204 A1  10/1998

(Continued)

OTHER PUBLICATIONS

J.F. Allen et al., "What's in a Semantic Network?" Annual Meeting of the ACL, Proceedings of the 20th annual meeting on Association for Computational Linguistics, Toronto, Ontario, Canada, Session 1, 1982 (pp. 19-27).

(Continued)

*Primary Examiner*—David R Vincent
*Assistant Examiner*—Mai T Tran
(74) *Attorney, Agent, or Firm*—Imparium Patent Works; Darien K. Wallace (57) ABSTRACT

A computer-implemented network structure includes a semantic network machine comprised of nodes containing informational contents and links containing relational contents. Relational contents describe the relationship between linked nodes. Some of the nodes are semantic Janus units. Based on time-variable states of each semantic Janus unit, the semantic Janus units perform operations on nodes and links. The operations are focused on selected portions of the semantic network machine such that each semantic Janus unit need not deal with all possible informational and relational contents within the semantic network machine. The computational resources of the computer network are thereby efficiently managed, and artificial intelligence tasks such as inferential retrieval are performed quicker. The amount of data that is processed is substantially reduced by focusing on bundled information. The semantic network is used for pattern recognition, for example, to recognize blood vessels in a medical image or streets on a digital satellite image.

27 Claims, 8 Drawing Sheets

U.S. PATENT DOCUMENTS

| | | | | |
|---|---|---|---|---|
| 4,912,648 | A | 3/1990 | Tyler | 364/513 |
| 5,353,371 | A | 10/1994 | Honiden et al. | 706/45 |
| 5,434,777 | A | 7/1995 | Luciw | 704/9 |
| 5,802,508 | A | 9/1998 | Morgenstern | 706/55 |
| 5,870,751 | A | 2/1999 | Trotter | 707/102 |
| 5,905,991 | A | 5/1999 | Reynolds | 707/501 |
| 6,151,679 | A | 11/2000 | Friedman et al. | 726/3 |
| 6,681,017 | B1 | 1/2004 | Matias et al. | 380/277 |
| 6,789,054 | B1 | 9/2004 | Makhlouf | 703/6 |
| 6,944,603 | B2 | 9/2005 | Bergan et al. | 706/45 |
| 2002/0188436 | A1 | 12/2002 | Schmidt et al. | 704/1 |
| 2004/0205035 | A1* | 10/2004 | Rimoux | 706/14 |

FOREIGN PATENT DOCUMENTS

| | | | |
|---|---|---|---|
| EP | WO 00/60497 | A3 | 3/2000 |
| WO | WO 00/63788 | A3 | 4/1999 |

OTHER PUBLICATIONS

L.A. Becker, "Network Processing of Hierarchical Knowledge for Classification and Diagnosis," Worcester Polytechnic Institute, Massachusetts, IEEE, Jun. 21, 1987 (pp. II-309 through II-317) doc XP000042313.

R. Bingi et al., "A Framework for the Comparative Analysis and Evaluation of Knowledge Representation Schemes," Texas Tech University, Texas, Sep. 1993 (pp. 233-247).

P.R. Cohen et al., "Classification by Semantic Matching," University of Massachusetts, Amherst, Feb. 25, 1987 (pp. 566-570) doc XP002152703.

R.L. Griffith, "Three Principles of Representation for Semantic Networks," IDM Corp., ACM Transactions on Database Systems, vol. 7, Issue 3, Sep. 1982 (pp. 417-442).

E.P. Lim, "Semantic Networks and Associative Databases: Two Approaches to Knowledge Representation and Reasoning," University of Minnesota, IEEE Expert, Aug. 1992 (pp. 31-40) doc XP002129793.

D. Tudhope, (Navigation Via Similarity: Automatic Linking Based on Semantic Closeness, University of Glamorgan, Wales, U.K., IEEE 1990 (pp. 233-242).

Y.K. Yang, "Behind the Inheritance Relations In a Semantic Network," IEEE Proceedings, 1990 Souteastcon', IEEE Apr. 1, 1990 (pp. 289-295) doc XP000203113.

Grabber et al., "Consistent, Yet Anonymous, Web Access with LPWA", Feb. 1999/vol. 42, No. 2, Communications of the ACM, pp. 42-47.

U.S. Appl. No. 09/806,727, filed Jul. 9, 2001, Schmidt et al.

Jagannathan et al., "SIM: A Database System Based on the Semantic Data Model", Unysis Corporation, Irvine, CA, 1988, pp. 46-55.

* cited by examiner

SITUATION DEPENDENT OPERATION OF A SEMANTIC NETWORK MACHINE

CROSS REFERENCE TO RELATED APPLICATION

This application is a continuation in part of, and claims priority under 35 U.S.C. §120 from, nonprovisional U.S. patent application Ser. No. 10/031,243 entitled "Situation-dependent Operation Semantic Nth-Order Network," filed on Oct. 18, 2001, now abandoned for which the requirements of 35 U.S.C. 371 were fulfilled on May 28, 2002. Application Ser. No. 10/031,243 in turn is a continuation of PCT application PCT/EP00/03540 filed on Apr. 18, 2000, which in turn is a continuation application of German Application No. DE 199 17 592.6 filed on Apr. 19, 1999. This application claims the benefit under 35 U.S.C. §119 from German Application No. DE 199 17 592.6 filed on Apr. 19, 1999, in Germany. The subject matter of each of the foregoing documents is incorporated herein by reference.

TECHNICAL FIELD

The present invention relates generally to semantic networks, and more specifically to using the "affect" of a node of a semantic network machine to manage computational resources of a computer network.

BACKGROUND

Computers have been developed that apply semantic network machines to perform artificial intelligence tasks, such as inferential retrieval. The semantic network machines represent information in a way that facilitates the retrieval of relevant facts relating to defined objects. A semantic network machine has data structures that permit each defined object to be represented only once in the semantic network machine. The data structures enable inferential retrieval to be performed easily. The data structures include objects (also referred to as nodes) and links between the nodes.

Semantic network machines have been used with "emotional agents" to perform tasks in the fields of artificial intelligence and "artificial life". One commentator has described an emotional agent as having one or more of the following properties:

a) the agent acts in environments,
b) the agent has a plan of action,
c) the agent is autonomous,
d) the agent has its own memory area of the computer or accesses memory areas used by all agents,
e) the agent assumes a specific, defined task within an agent system,
f) the agent possesses the ability to learn, which may be supported through neural networks,
g) the agent has assessment mechanisms,
h) the agent exhibits dynamic adaptive behavior, and
i) the agent exhibits emotions that influence the agent's behavior and are influenced by the agent's behavior. See, "Künstliches Leben, Anspruch und Wirklichkeit" (Artificial Life: Contentions and Reality) by Werner Kinnebrock, 1996, Oldenbourg, ISBN 3486234854. A system of emotional agents is either structured hierarchically or operated with distributed control. The "emotions" of the emotional agents represent human moods that are carried along when operating in the agent system and thus influence the operation of the agent system. A conventional semantic network is described in detail by Eo-Pong Lim et al. in "Semantic Networks and Associative Databases: Two Approaches to Knowledge Representation and Reasoning," IEEE Expert, Vol. 7, No. 4, August 1992, pages 31-40.

The above-mentioned technical literature describes behavior-based agent systems that intelligently process information and solve defined tasks with a high degree of success. Such agent systems can act in both artificial and real environments. Evolutionary development and individual learning are two ways in which these systems acquire their abilities. Conventional behavior-based agent systems simulate and describe emotions of humans and animals. Although computers and emotional agents are mentioned that are capable of exhibiting emotions, the purpose of doing so has been merely to simulate, describe and explain human and animal emotions.

When a modern computer network is operated at the limit of its computational speed, one of the remaining ways to enhance the performance of the computer network is to use the available computational resources more efficiently. Existing approaches to using computer resources more efficiently, however, seldom compensate for the increasing complexity of computer-implemented network structures. With increasing complexity of computer-implemented network structures, it becomes more difficult to access all of the information within the computer-implemented network structure. In particular, current approaches to managing computational resources efficiently are ill-suited to demand-oriented operation of computer-implemented network structures.

For example, current resource management approaches for a computer-implemented network structure with a semantic network machine do not consider the state of the semantic network machine that exists at a specific time. Thus, a computer-implemented network structure is sought whose operation is dependent on the state encountered by the semantic network machine.

SUMMARY

A computer-implemented network structure includes a semantic network machine comprised of nodes and links. Each node contains informational contents and relational contents. Each link describes the specific relational contents that link two nodes such that the relationship between the two linked nodes is determined by the specific relational content. The computer-implemented network structure operates based on the states of the nodes encountered by the semantic network machine.

At least one of the nodes is a semantic Janus unit that is linked to another node through a link. The semantic Janus unit is capable of carrying out operations on itself, on the nodes to which it is linked, on the nodes that are directly or indirectly linked to nodes to which it is linked, and on the links to any of the aforementioned nodes.

The semantic Janus units possess states that vary over time and that determine which operations are to be carried out on which nodes and links. Based on the situation existing in the semantic network machine, which is expressed through the time-variable states of each semantic Janus unit, the semantic Janus unit performs operations on nodes and links. The operations are focused on selected portions of the semantic network machine. As a result, at any given time, the semantic Janus unit need not deal with all possible informational contents or relational contents of nodes and links within the semantic network machine.

The computational resources of the computer network are efficiently managed, and artificial intelligence tasks such as inferential retrieval are performed quicker, when the processing performed by the semantic network machine is focused on informational contents and relational contents present in selected nodes determined by the time-variable states of the semantic network machine. Thus, the amount of data that is processed is substantially reduced by focusing on selected parts of the semantic network machine. The computational resources of the computer network are thereby allocated to computations on more relevant data, and tasks can be performed more quickly.

In one embodiment, the semantic Janus units both monitor and shape a vicinity. The semantic Janus units perform operations on informational contents and relational contents located in nodes within the vicinity. A future state of a semantic Janus unit is determined from the existing state of the semantic Janus unit and by monitoring and analyzing a variable vicinity. The future state of the semantic Janus unit can modify both the vicinity to be monitored and the vicinity to be shaped.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

A semantic network machine comprised of nodes and links is part of a computer-implemented network structure. Nodes contain informational contents and relational contents. Links describe the specific relational contents that link two nodes. Informational contents and relational contents is information that is structured hierarchically in the semantic network machine.

FIGS. 1A-1E show representations of types of links present in an nth-order semantic network machine. The most elementary types of links are either (i) exchange relations or (ii) relations. Exchange relations describe an abstract, material or communicative exchange between nodes. Relations, on the other hand, describe relations between nodes as described by relational contents. FIGS. 1A through 1E show several examples of elementary links that describe relational contents.

The links shown in FIGS. 1A-1E describe the relational contents that define the relations between a node A and a node B. Where information is structured hierarchically, links of the exchange relation type are further subdivided into two groups. The first group links nodes at different hierarchy levels. The second group links nodes at the same hierarchy level.

Figure 1A:
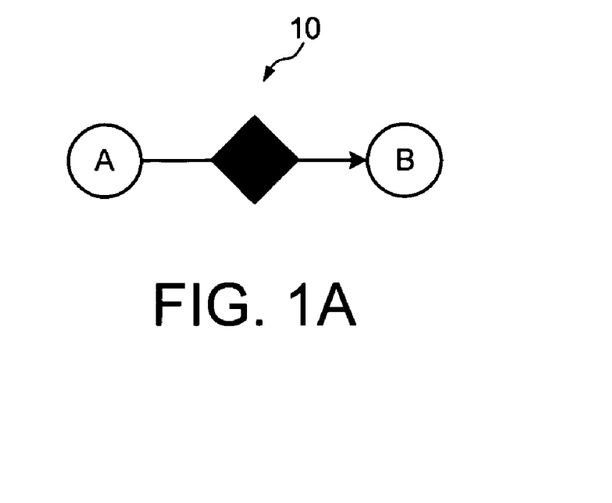
FIGS. 1A-1E are diagrams representing links used by a semantic network machine of a computer-implemented network structure.

FIG. 1A represents a link 10 in the first group of exchange relation-type links. Link 10 interconnects nodes at different hierarchy levels of the nth-order semantic network machine.

FIG. 1A represents the relationship between a larger, superordinated node A and a smaller, subordinated node B and vice versa. Thus, link 10 represents a change in scale of information. Links that exhibit the two features of exchange and scale change are hereinafter designated as VA/VS-type links. The label "VA" represents "exchange", and the label "VS" represents "scale change". In FIG. 1A, link 10 of the VA/VS type denotes "A contains B" in the direction of the arrow from A to B, and "B is part of A" in the opposite direction. This corresponds to the definition of an embedding hierarchy.

Figure 1B:
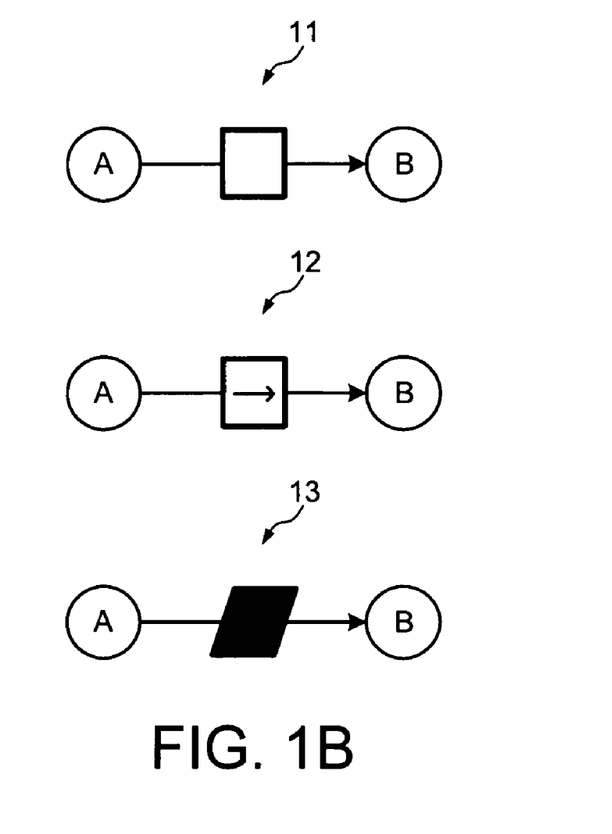
Figure 1C:
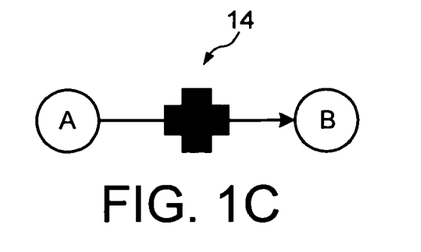

FIG. 1B shows links 11, 12 and 13 of the exchange relation type that interconnect nodes in the same hierarchy levels of the nth-order semantic network machine. These links do not exhibit a scale change. Links having relations that exhibit the features of an exchange and no scale change are designated as links of the VA/VH type. The label "VA" accordingly represents "exchange", and the label "VH" represents "no scale change". A link of the VA/VH type denotes "A is an input quantity of B" in the direction from A to B, and "B is an output quantity of A" in the opposite direction. For example, the link 13 is of the VA/VH type may be regarded as "A is described by B" in the direction from A to B, and "B is attribute of A" in the opposite direction.

Where information is structured hierarchically, links of the relation type are further subdivided into two groups. The first group links nodes at different hierarchy levels. The second group links nodes at the same hierarchy level. FIG. 1C shows a link 14 in the first group of exchange relation-type links. Link 14 interconnects nodes at different hierarchy levels of the nth-order semantic network machine. Links in the first group describe the relationship between a more general node and a more specific node and vice versa. Links in the first group, such as link 14, perform a scale change.

Links having relations that exhibit the two features of relation and scale change are hereinafter designated as VR/VS links. The label "VR" represents "relation", and the label "VS" represents "scale change". In FIG. 1C, link 14 of the VR/VS type denotes "A in particular is B" in the direction of the arrow from A to B shown, and "B in general is A" in the opposite direction. This corresponds to the definition of a similarity hierarchy.

Figure 1D:
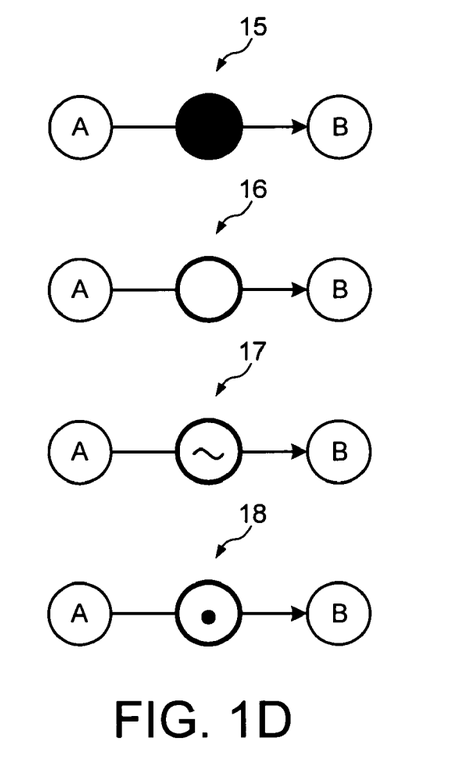

FIG. 1D shows links 15, 16, 17 and 18 of the relation type that interconnect semantic units in same hierarchy level of the nth-order semantic network. These links to not exhibit a scale change. Links having relations that exhibit the features of a relation and no scale change are designated as links of the VR/VH type. The label "VRl" represents "relation", and the label "VH" represents "no scale change". For example, a link of the VR/VH type such as the link 16 denotes "A is (locally) adjacent B". A link of the VR/VH type such as the link 17 denotes "A is similar to B". A link of the VR/VH type such as the link 18 denotes "B follows after A" in the direction from A to B and "A is followed by B" in the opposite direction.

Figure 1E:
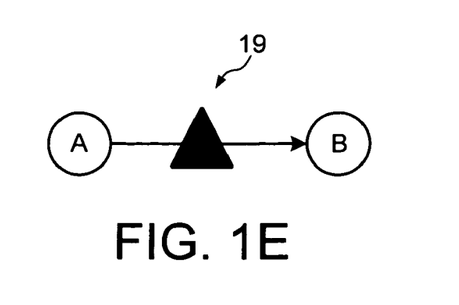

FIG. 1E shows another link 19 that denotes "A has Janus function B" in the direction from A to B and "B is Janus function of A" in the opposite direction. An embodiment of a semantic network machine employing link 19 is described in more detail below. In addition to the links described above, other types of links may also be selected or freely defined by a user of the semantic network machine. The elementary types of links described above are, however, defined in advance in a basic library and may be selected by the user.

For additional information regarding fractal networks (semantic networks), semantic units (nodes) and links (links), see U.S. patent application Ser. No. 10/197,150 entitled "Nth-Order Fractal Network for Handling Complex Structures", the entirety of which is incorporated herein by reference. See also U.S. patent application Ser. No. 10/197,150 also entitled "Nth-Order Fractal Network for Handling Complex Structures", which is a continuation of U.S. patent application Ser. No. 09/806,727. U.S. patent application Ser. No. 09/806,727 in turn is a continuation of German Patent Application No. DE 199 08 204.9, filed on Feb. 25, 1999.

Figure 2:
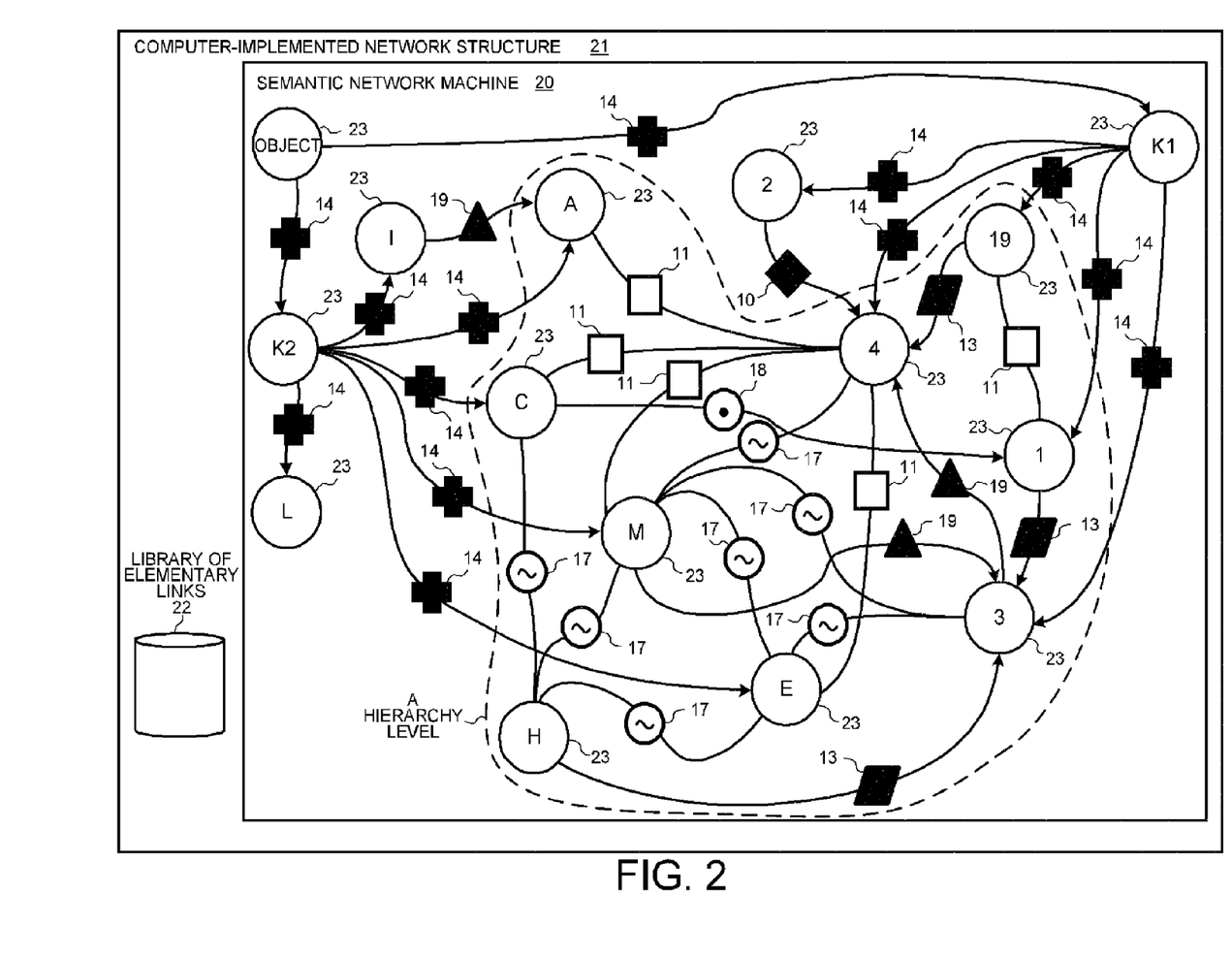
FIG. 2 is a schematic illustration of an exemplary semantic network machine within a computer-implemented network structure.

FIG. 2 shows an embodiment of a semantic network machine 20 that is part of a computer-implemented network structure 21. Computer-implemented network structure 21 also includes a library of elementary links 22. Semantic network machine 20 includes a plurality of nodes 23. Certain of the nodes 23 are labeled "object", "K1", "A" and "4". The nodes 23 are linked by various types of elementary links, such as links 10 of the type "contains/is part of", links 11 of the type "interacts with", links 14 of the type "in particular is/in general is", links 15 of the type "is described by/is attribute of", links 17 of the type "is similar to", links 18 of the type "follows after/is followed by", and links 19 of the type "has Janus function/is Janus function of". For example, the association between the node labeled "object" and the node labeled "K1" is described by the link 14, which is of the type "object" in particular is "K1", or "K1" in general is "object". The association between the node labeled "A" and the node labeled "4" is described by the link 11, which is of the type "A" is similar to "4", or "4" is similar to "A".

The nodes within semantic network machine 20 contain at least informational contents. The links within semantic network machine 20 contain at least relational contents that specify the kind of mutual relation between the nodes that are linked by the respective links.

In addition to the characteristics described above, links are either directional or non-directional. Moreover, directional links are either directed or bidirectional. Within semantic network machine 20 of FIG. 2, the links 10, 13, 14, 18 and 19 are directional links, i.e., links whose respective type of association has one meaning in one direction and another (the opposite) meaning in the opposite direction. In contrast, the links 11 and 17 are drawn without an arrow and are bidirectional links, whose type of association has a same meaning in both directions.

The links 19 are of the type "has Janus function" or "is Janus function of". These links 19 introduce a particular type of node into semantic network machine 20. These nodes are then capable of carrying out certain operations on other nodes and links. This particular type of node is referred to as "a semantic Janus unit".

A semantic Janus unit can perform various operations: (a) recording values of attributes of nodes and links; (b) changing the values of attributes and informational content of nodes and links; (c) generating new nodes and links; (d) bundling existing nodes into a single node; (e) comparing existing nodes and links; (f) calculating a function and performing an algorithm on the contents of nodes and links; (g) recording a Janus or part of a Janus, i.e., classifying an algorithm or part of an algorithm; and (h) deleting existing nodes and links. The semantic Janus units perform these operations using an algorithm or a collection of algorithms. The semantic Janus unit operates with other nodes and links in its "vicinity" and is connected to those nodes through a the specific link 19 of the type "has Janus function" or "is Janus function of". Thus, the functionality of a semantic Janus unit is limited to carrying out the aforementioned operations on the nodes and links that are located within a predetermined "vicinity" of the semantic Janus unit.

An essential task of a semantic Janus unit is the bundling and contexting of informational contents. Bundling involves calculating informational contents of nodes that serve as a center for the informational contents of adjacent nodes and links. Contexting is the analogously inverted process of bundling. Contexting involves changing the informational contents of adjacent nodes and links based on the informational contents of the nodes that serves as the center. The center node defines the vicinity of nodes that are operated open. The bundling operation allows information and statistics from a set of nodes to be continually updated. The contexting operation allows changes in basic conditions to be passed on to a set of nodes.

The following nodes 23 of semantic network machine 20 of FIG. 2 are semantic Janus units: "3", "I", and "M". Semantic Janus unit "I" is linked to the node labeled "A" through link 19 of the type "has Janus function" or "is Janus function of". Semantic Janus unit "3" is linked to the node labeled "4" through link 19 of the type "has Janus function" or "is Janus function of". Thus, the relationship between Semantic Janus unit 3 and node 4 is "3" has the Janus function "4", or "4" is the Janus function of "3". Semantic Janus unit "M" is linked to the semantic Janus unit "3" through link 19 of the type "has Janus function" or "is Janus function of". Thus, the relationship between Semantic Janus unit M and semantic Janus unit "3" is "M" has the Janus function "3", or "3" is the Janus function of "M".

The above-mentioned term "vicinity" is closely connected with distance. A first node is in the vicinity of a second node when the distance between them is smaller than a predetermined value. One measure of the distance between nodes is based on the number of nodes through which the second node may be reached starting from the first node. The distance also describes the distance between informational and connotational contents in the nodes. The distance may also be calculated by weighting the various links through which the path between nodes follows. The same type of link receives the same weighting. Thus, a distance function is used for indicating the distance between two nodes. In order to determine the distance based on the weight of the links, a mathematical function with a variable parameter "G" is set as the distance function. The parameter "G" is present in each link function and expresses the degree of association of the nodes connected by the link.

Instead of using a distance function with the parameter "G", the vicinity of a node may also be defined by classifying the type of vicinity. The immediate vicinity is defined as one wherein a node is directly linked with another node through a link. The mediate vicinity, on the other hand, is defined as one wherein a node is indirectly linked to another node through several nodes and links.

In addition to the features described above, semantic Janus units also possess a time-variable state. The time-variable state of a semantic Janus unit allows the semantic network machine to carry out operations depending on the current situation in the semantic network machine 20. The time-variable state introduces temporally dynamic behavior into the semantic network machine 20 and allows for the flexible allocation of computational resources. Inasmuch as a semantic Janus unit in the semantic network machine 20 is viewed depending on its time-variable state, the state expresses a current degree of excitation or affect of the semantic Janus unit.

Figure 3:
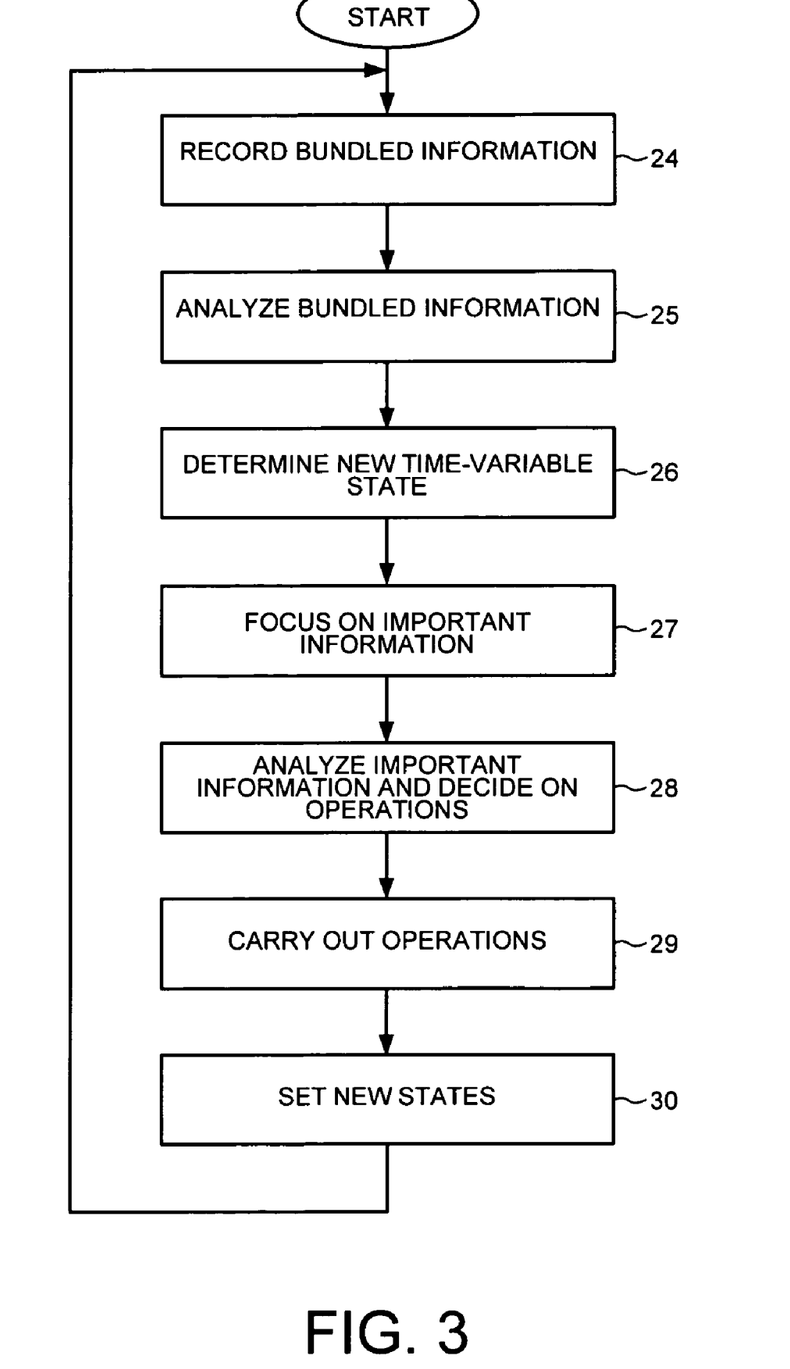
FIG. 3 is a flowchart of steps performed in the operation of the semantic network machine of FIG. 2.

FIG. 3 is a flowchart showing steps by which one embodiment of semantic network machine 20 can advantageously conserve computational resources of computer-implemented network structure 21 in the performance of artificial intelligence tasks, such as inferential retrieval. This embodiment of semantic network machine 20 performs pattern recognition, such as recognizing blood vessels in a medical image or recognizing streets on a digital satellite image. The operation of individual elements of semantic network machine 20, as shown in FIG. 2, is explained in detail in connection with the steps 24-30 listed in FIG. 3.

In steps 24 and 25, a semantic Janus unit of semantic network machine 20 performs rough pattern recognition. In step 24, a semantic Janus unit uses statistical examination to record bundled information about informational contents, attributes, functions, and the vicinity of a node to which the said semantic Janus unit is linked. A semantic Janus unit can also record bundled information about a partial network of the semantic network machine around the said semantic Janus unit.

In step 25, the semantic Janus unit analyzes the bundled information in order to determine what is essential. The semantic Janus unit analyzes which informational contents, attributes, functions and links are "important". Semantic network machine 20 thereby determines which information the semantic Janus unit is to concentrate on. Semantic network machine 20 makes this determination using the time-variable state of the semantic Janus unit. Semantic network machine 20 determines the subset of the vicinity around the semantic Janus unit that is to be monitored. By concentrating on a subset of the vicinity, semantic network machine 20 substantially reduces the amount of information that is processed, and thus considerably economizes computational resources.

In step 26, semantic network machine 20 determines a new time-variable state of the semantic Janus unit using the existing time-variable state, the bundled information analyzed in step 25, and additional evaluation criteria. The additional evaluation criteria involve when and how to carry out subsequent analysis. Semantic network machine 20 uses the additional evaluation criteria to decide: (a) which nodes, which partial network of the semantic network machine, and what informational contents of the nodes are to be handled next; b) which priorities are set in a node, in a partial network, and in the entire semantic network machine; c) in what manner time-variable states of semantic Janus units are to be determined from the states of nodes, of partial networks, and of the entire semantic network machine; d) how rapidly time-variable states of semantic Janus units change; and e) in what manner nodes and links are handled.

The additional evaluation criteria are determined individually for each semantic Janus unit. Consequently, each semantic Janus unit exhibits its own subjective behavior on account of these evaluation criteria. The evaluation criteria thus express the character of each semantic Janus unit. A semantic Janus unit has both a character and an affect. The character of a semantic Janus unit has fundamental characteristics corresponding to the affect, and the fundamental characteristics determining the manner in which processing within semantic network machine 20 is to be performed. The time-variable state of the semantic Janus units constitutes an affect.

The main difference between a character and an affect of a semantic Janus unit is that the affect is highly dynamic, whereas the character is not. After a new situation has been detected in semantic network machine 20 during rough pattern recognition, the affect may rapidly change depending on the new situation. The affect in general is a property having an immediate effect not subject to any time delay. The character, on the other hand, exhibits only minimal changes throughout the entire lifetime of a node. The lifetime of a node is the time period from generation to deletion of the node.

In step 27, semantic network machine 20 focuses on those informational contents, attributes, functions and links that were analyzed as being "important" in step 25. This corresponds to a focused pattern recognition. In one example of a focused analysis, a semantic Janus unit focuses only on-links of the "VA/VH" type and thus of the "exchange without scale change" type.

In step 28, the semantic Janus unit analyzes the informational contents, attributes, functions and links that semantic network machine 20 focused on in step 27. The semantic Janus unit determines which operations and actions are to be performed. In the example of focusing on the "VA/VH" type links, the semantic Janus unit may determine which links or types of links are to be deleted, or what informational contents of nodes linked through these links are to be changed.

In step 29, the operations and actions determined in step 28 are carried out. An example of such an operation is the construction of a new kind of vicinity link, corresponding to the formation of a structure. The vicinity that is shaped is the vicinity in which operations are carried out, and need not be identical to the vicinity that is monitored. The vicinity to be shaped and the vicinity to be monitored may be different from each other, identical to each other, or overlap each other depending on the situation existing in semantic network machine 20, the time-variable state of the semantic Janus unit or the evaluation criteria of the semantic Janus unit. The vicinity to be shaped is determined in the same way as described above with respect to the immediate and mediate vicinities, whereby the time-variable state of the semantic Janus unit enters into the determination.

In step 30, new states of semantic network machine 20 are set. The values of informational contents of the nodes and links are changed as governed by the operations. New informational contents, new types of informational contents, new nodes, links and partial networks are introduced. Finally, nodes, links and partial networks within semantic network machine 20 and changed and deleted.

Following step 30, the rough pattern recognition of steps 24 and 25 is again performed, and the procedural flow of semantic network machine 20 starts anew.

A semantic Janus unit has both a vicinity to be monitored and a vicinity to be shaped. The semantic Janus unit monitors the vicinity to be monitored and carries out the operations on the vicinity to be shaped. A new state of a semantic Janus unit may be determined from the existing state of the semantic Janus unit or from an analysis-of the monitored vicinity. The monitored vicinity may be changing. In addition, the new state of the semantic Janus unit may act both on the vicinity to be monitored and on the vicinity to be shaped.

The semantic Janus unit focuses in a situation-dependent manner on superobjects, subobjects, or on objects adjacent to the node to which the semantic Janus unit is linked. Superobjects represent nodes that are situated on a higher scale than the nodes to which the semantic Janus unit is linked. Subobjects in turn are nodes that are situated on a lower scale than the node to which the semantic Janus unit is linked. Adjacent objects are nodes that are situated on the same scale as the node to which the semantic Janus unit is linked. The semantic Janus unit can also focus on the links to the superobjects, subobjects and adjacent objects.

The vicinity to be monitored and the vicinity to be shaped are derived from the vicinity of nodes that are linked to the semantic Janus unit through links of the type "has Janus function" or "is Janus function of". Semantic Janus units, however, may also be linked to other nodes through other types of links.

The other nodes linked to the semantic Janus units form superobjects, subobjects and adjacent objects to the semantic Janus units depending on the type of links to the nodes. Thus, the vicinity to be monitored and the vicinity to be shaped may also possess vicinity ranges that result from the vicinity relation to the semantic Janus unit that has the superobjects, subobjects and adjacent objects. The vicinity ranges may in turn depend on the existing time-variable state of the semantic Janus unit and change with a modification of this time-variable state. As a result, a semantic Janus unit may focus only on itself. Therefore, the semantic Janus unit can change and delete its own informational contents and associations or even delete itself. One example of this is a semantic Janus unit searching for a new place for itself in semantic network machine 20.

Therefore, semantic Janus units are linked to other nodes through links, and may perform operations on themselves, on the nodes to which they are linked, on nodes to which the linked nodes are directly or indirectly linked and on the links to these nodes. Moreover, semantic Janus units possess time-variable states that determine what operations are to be carried out on which nodes and links.

The time-variable states permit semantic network machine 20 to perform dynamic operations that detect an existing situation the semantic network, decide about further steps to be performed depending on the situation, and perform those steps. These dynamic operations are in addition to operations performed based on a before/after analysis of the semantic network that is changed independently of the situation. Demand-oriented operations are thereby enabled within semantic network machine 20.

Figure 4:
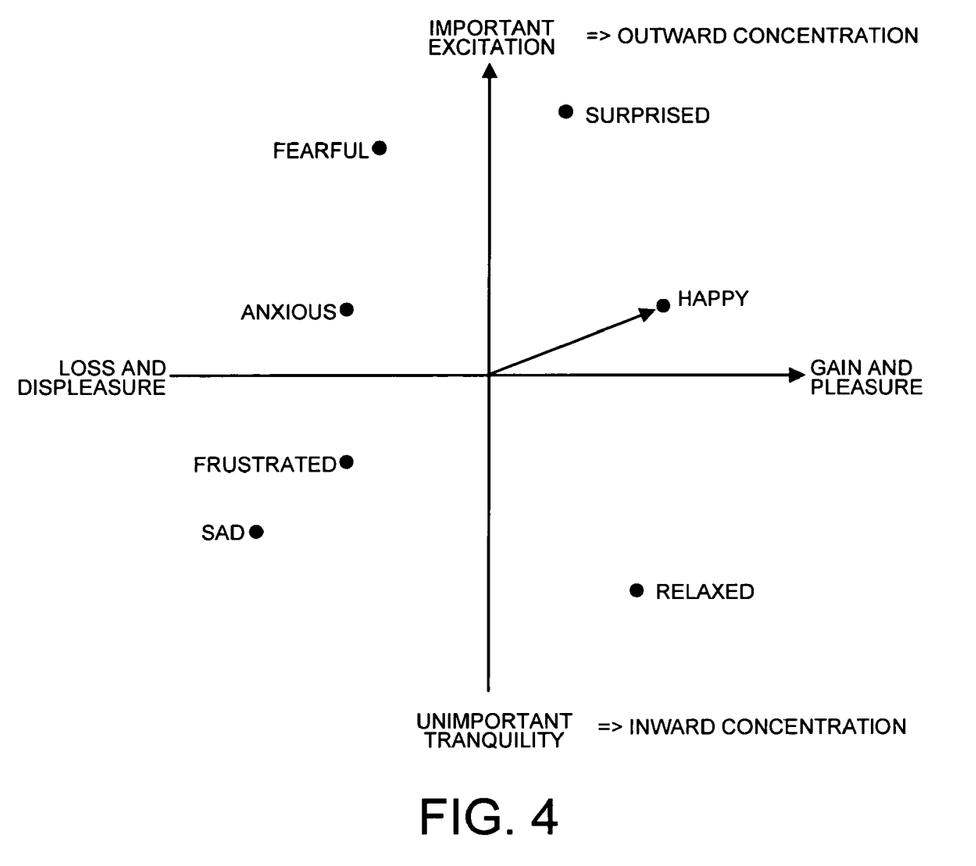
FIG. 4 is a schematic illustration of coordinates of emotional effects applicable to operations of the semantic network machine of FIG. 2.

FIG. 4 shows a system of coordinates representing the quality of various affects of time-variable states of semantic Janus units in semantic network machine 20. The operation of semantic network machine 20 is now described in relation to how the affects shown in FIG. 4 may be changed. In relation to humans, affects are generally considered as states in which an individual may find himself. From literature, five fundamental states are known: grief, fear, relaxation, surprise and joy. These fundamental states are representative of an accumulation of similar states, such as anxiety and frustration. The system of coordinates represented in FIG. 4 is derived from the traditional human affects. The system of coordinates describes the state of a node within semantic network machine 20. The coordinates of the system are depicted in two dimensions. The positive x-axis is designated "gain", and the negative x-axis is designated "loss". The positive y-axis is designated "important", and the negative y-axis is designated "unimportant".

In addition to the x and y coordinates, additional sub-coordinates may be derived from each axis of the system of coordinates through additional attributes. Such additional attributes are, for example, references to objects, time and space.

Nodes representing "affects" may be embedded into the system of coordinates of affects. Both "affects" nodes and the "system of coordinates of affects" can be included in semantic network machine 20 of FIG. 2. The nodes representing affects and the system of coordinates of affects are linked to each other through links of the type that result in a scale change. Analogously, affects nodes are linked to other affects nodes through links of the type that result in no scale change.

For example, an "affects" node named "in fear" is linked through links to "affects" nodes named "frustration" and "panic" (neither shown in FIG. 4). In another example, an "affects" node denominated "acute existential fear" (not shown in FIG. 4) is a subobject of the node "in fear" and thus constitutes a specialization of the latter. Depending on the situation, this kind of description of affects allows for a rough or detailed description of affects. As a result of such a description of affects, a semantic Janus unit only focuses on bundled, rough information. Thus, bundled information is used in the processes of pattern recognition, decision-making, and execution of actions as described above.

The system of coordinates represented in FIG. 4 can be used by semantic network machine 20 for rough pattern recognition. First, semantic network machine 20 searches for unusual changes in the informational contents, attributes and functions of a node. This is followed by a search for specific changes, such as changes in the informational contents of a particular kind of link. Then, the overall state of the semantic unit is roughly classified, for example, as being either "good" or "bad". Finally, the entire state of the node is classified using the results of the searches for changes in the attributes "important", "unimportant", "gain" and "loss". "Gain", "loss", "important" and "unimportant" are the designations of the axes of the system of coordinates of affects in FIG. 4.

Shifts within the system of coordinates upon a change of an affect are described with the aid of a set of rules or a model. Such shifts include shifts upon a change of the time-variable state of a semantic Janus unit on the basis of a situation detected in semantic network machine 20. Depending on the application, a user of semantic network machine 20 may freely select the layout of such a model or set of rules. For example, an improvement of a situation of a node may be found when the number of objects within the vicinity of the node increases. A set of rules or a model may define a gain to have resulted in the overall situation of a linked node, and thus may define the affect of a semantic Janus unit to have changed in the direction of the positive x-axis, resulting in gain and pleasure.

Affects are thus incorporated into evolutionary strategies for context-dependent focusing on what is essential. The affects may be described as nodes embedded in the system of coordinates of affects in FIG. 4. Using affects allows the information concerning the currently existing situation of a node or partial network to be bundled at one point within the system of coordinates of affects. The current affect, i.e., the present time-variable state, of a semantic Janus unit thus represents bundling of the informational contents and of information relating to the vicinity of a node or of a partial network.

The affect and character of a semantic Janus unit may be utilized for pattern recognition, for decision-making, for performing actions and for determining the consequences of those actions in networks. Examples of such networks are a computer network, an electricity network, a traffic network, a supply chain network, a semantic network within a database, and the Internet. Each of these networks may be described as and nth-order semantic network. Using the affect and character of semantic Janus units for resource management in networks allows computations to be focused on essential information in nodes and partial networks. This allows essential operations to be performed in less time. Besides time, other resources may be saved, such as environmental resources, information, knowledge and space.

The system of coordinates represented in FIG. 4 can be used by semantic network machine 20, for example, for automatic map generation. Semantic network machine 20 performs pattern recognition on digital satellite images that include roads. Where the digital images show that a road is interrupted by a tree, for example, semantic network machine 20 determines that the road continues through (under) the tree.

Figure 5:
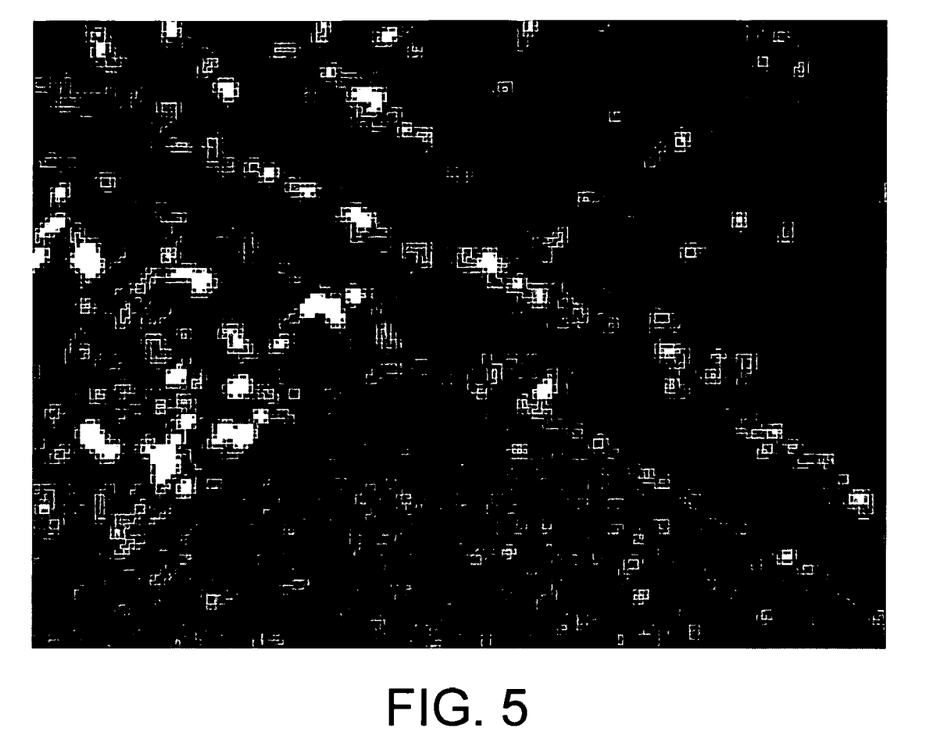
FIG. 5 is a digital satellite image of a road interrupted by a tree upon which pattern recognition is performed.

FIG. 5 shows a digital satellite image of a road interrupted by a tree. The road passes through fields and along backyards. Semantic network machine 20 performs pattern recognition and recognizes segments of the road up to the tree. Then semantic network machine 20 performs different operations in order to recognize that the road continues past the tree. In this manner, semantic network machine 20 is used to generate a transportation infrastructure map.

Figure 6A:
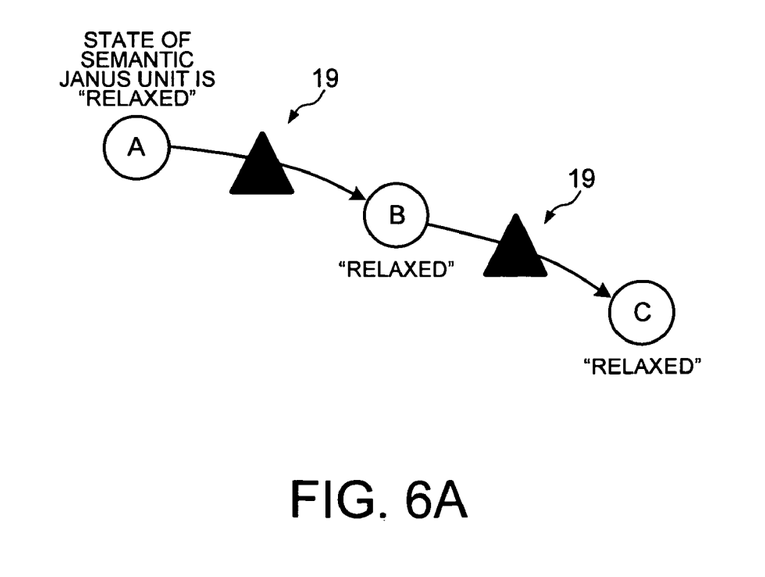
FIGS. 6A-6E are diagrams illustrating the operation of the semantic network machine of FIG. 2 as successive segments of the road of FIG. 5 are recognized.

FIG. 6A-6E are diagrams illustrating the operation of semantic network machine 20 as successive segments of the road are recognized. FIG. 6A is a diagram showing two links between three semantic Janus units that represent segments of the road that have been recognized. Semantic Janus unit A is linked to semantic Janus unit B, which in turn is linked to semantic Janus unit C. As the initial road segments are recognized, semantic Janus unit A has a "relaxed" state. The relaxed state of semantic Janus unit A is dependent on the relaxed state of semantic Janus units B and C.

Figure 6B:
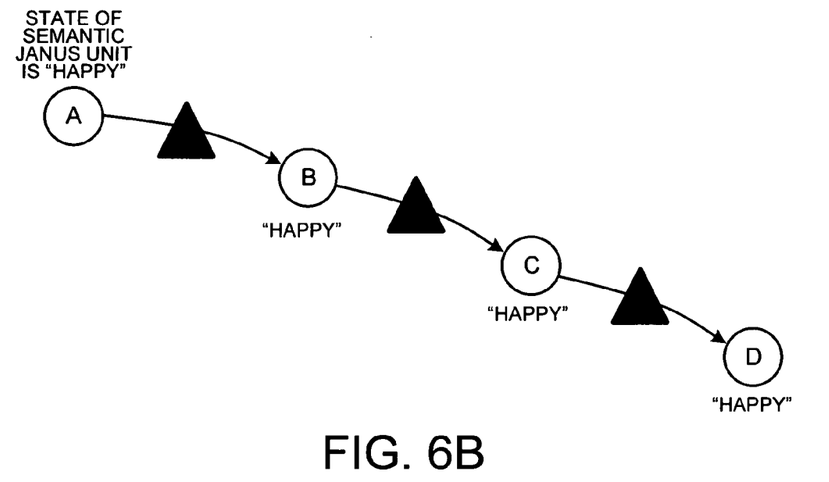

FIG. 6B illustrates the states of the semantic Janus units as more segments of the road are recognized. As successive road segments recognized, the state of semantic Janus unit A becomes "happy". In the happy state, semantic Janus unit A causes semantic Janus units at the end of the road segments to perform predetermined computational operations on the pixels surrounding the end of the recognized road segments. In the happy state, the last semantic Janus unit grows the road only into regions of pixels whose intensities are similar to the mean pixel intensity along the road. Computational operations are not performed on pixels that are not adjacent to pixels with the correct intensity. In this manner, computational resources of the computer-implemented network structure associated with semantic network machine 20 are conserved.

Figure 6C:
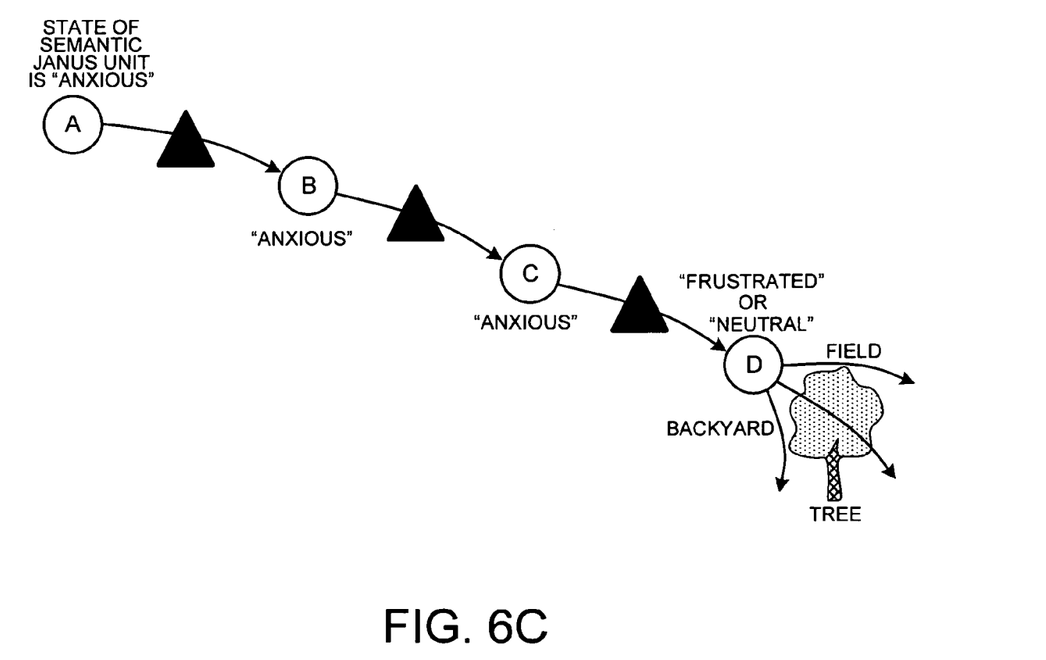

FIG. 6C illustrates the states of the semantic Janus units when road segments are not recognized near the last semantic Janus unit. The state of semantic Janus unit A is dependent on the state of the last semantic Janus unit D. Semantic Janus unit A becomes "anxious" and changes its behavior. Semantic Janus unit A changes the quality of the computational operations performed by the last semantic Janus unit D, which is indirectly linked to semantic Janus unit A. Computational operations are performed on pixels whose intensities are not similar to the mean pixel intensity along the road, so long as the pixels are in the road direction. The road segments therefore can grow into regions with different pixel intensities. Such regions might be backyards, fields or treetops. The last semantic Janus unit D becomes "frustrated" as it continues to grow the road in a direction of pixels whose intensity is not similar to the mean pixel intensity along the road.

A semantic Janus unit in a "frustrated" state performs different operations than a semantic Janus unit in a "happy" or "anxious" state. A frustrated semantic Janus unit searches farther away for pixels with the correct intensity or, if the correct intensity is not found within a predetermined distance, the frustrated semantic Janus unit gives up and switches to a "neutral" state. Searching then resumes at a previous semantic Janus unit. In this manner, computational resources are allocated to difficult search areas.

Figure 6D:
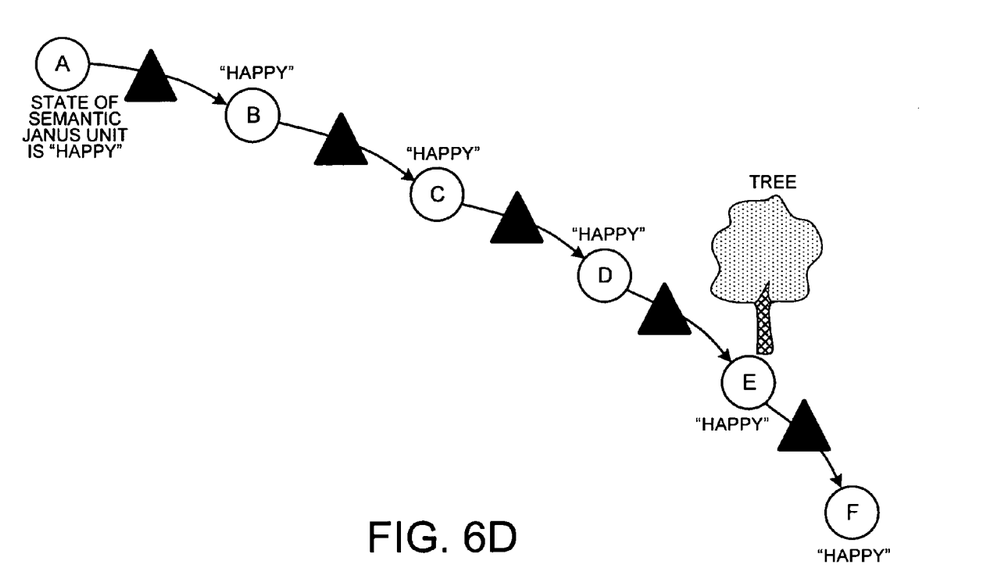

FIG. 6D illustrates that the state of semantic Janus unit A returns to "happy" when the last semantic Janus unit along the recognized road segments locates pixels with the correct intensity. When the newly recognized road segment is merged with the other road segments, semantic Janus unit A returns to "happy" and causes the semantic Janus units at the end of the recognized road segments to perform the original computational operations.

Figure 6E:
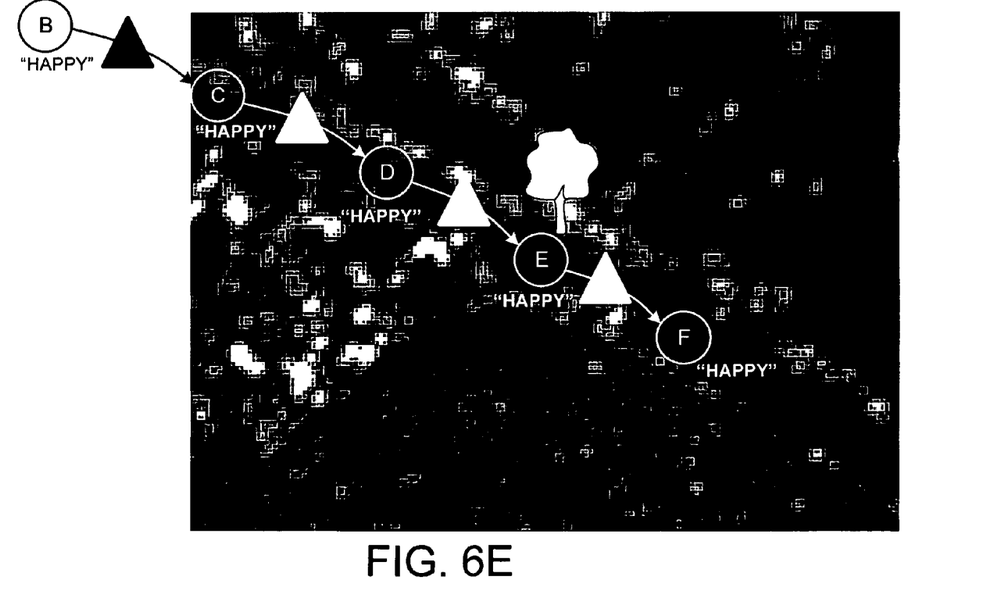

FIG. 6E shows how semantic network machine 20 recognizes the pattern of the road even though the road was interrupted by a tree. In this example, other semantic Janus units are used to recognize rivers, railroad tracks and urban areas. As multiple pattern recognition operations are performed simultaneously, the conservation of computational resources becomes increasingly important.

In a manner similar to recognizing a road from aerial imagery data, blood vessels, ligaments and other tissues can be recognized from medical images, such as x-rays, CAT scans (Computerized Axial Tomography) and magnetic resonance imagery (MRI).

In another embodiment of semantic network machine 20, time management instead of resource management of a computer-implemented network structure is performed. Semantic Janus units are used to perceive, generate, administer and fashion nodes of the semantic network machine over the duration of a time period. The time period is defined in relation to access to a node or to informational contents of a node. A time period may comprise one or several time units as informational contents. For example, one time period may be defined as one hour of calculation time.

Time is accordingly recorded as a node in semantic network machine 20. Through selective time segmentation, semantic Janus units sort out, classify, reposition, and delete semantic time units. In addition, semantic Janus units perform emergence, association and prediction on semantic time units. Semantic Janus units generate new semantic time units from a combination or from the interaction of other semantic time units (emergence). Semantic Janus units create connections between semantic time units (association, memory functions, learning). And semantic Janus units incorporate semantic time units into their algorithms such that the semantic time units form new semantic time units by simulation and expectation (prediction). Each time period becomes a semantic unit in semantic network machine 20. The different duration of the time periods in the vicinity of the semantic time unit is subject to the principles of evolutionary selection, i.e., memory functions. Nodes in semantic network machine 20 may relate to the past, present or future.

Semantic Janus units may operate within a virtual semantic network that they perceive. The semantic Janus units virtually reposition, recombine, newly generate, change, delete, and replace semantic units within their virtual semantic network. The semantic Janus units thereby calculate expectations, make predictions and find new identities. Within the virtual semantic network, a so-called "simulation within a simulation" becomes possible. The semantic Janus units possess and generate algorithms and methods, further develop them, and operate with them in a virtual semantic network of ideas or notions, just as in a physical network. Each semantic Janus unit creates within itself an image of a partial network and operates on the partial network just as if the image were a physical partial network. Thus, semantic network machine 20 can operate as a virtual semantic network and can emulate the human thought process.

In order to perform various operations, "temporal object" nodes are defined that contain as informational content the state of other nodes. The "temporal object" nodes perform time segmentation. The state of the nodes is used (1) to detect long-term and short-term changes of informational contents of nodes and partial networks such as attributes, functions, algorithms, (2) to store informational contents in semantic network machine 20 (memory function), (3) to organize informational contents in a relation to each other, (4) to form temporal patterns from the informational contents so as to recognize the informational contents.

A "temporal object" node is defined that contains as informational contents the state of the node, of the partial network where the node is located or of the entire network during a predetermined time period. With the aid of the memory function, a semantic Janus unit generates temporal objects in semantic network machine 20. The semantic Janus unit then replaces, deletes and arranges the temporal objects, and searches and recognizes the temporal objects.

One embodiment of the present invention can be used to associate geometric structures, such as graphic objects, with each other. The graphic objects thus constitute nodes that-are linked by links. The operation of semantic network machine 20 can change the shapes, textures, colors and contrasts of the graphic objects as a function of the situation existing in semantic network machine 20. In the application of associating graphic objects, vector graphics are used. In this application, semantic network machine 20 generates, changes and deletes "semantic view units". Semantic view units graphically and textually represent the existing semantic network (referred to as "model") to one or several users of semantic network machine 20.

The internal state of the semantic Janus unit that generates semantic view units may be pre-defined or changed by the user. A semantic model unit generated by a semantic Janus unit is referred to as a "central object". The user may specify that semantic view units are to be generated exclusively for those semantic model units that are located within a given vicinity of the "central object" and may be reached through predefined types of association. The user may also interactively carry out a selection and change while the program on semantic network machine 20 is running. In this way, a user may concentrate or focus on those sets of problems that are of interest to him.

Another embodiment of the present invention can be used for pattern recognition and simulation. For example, semantic network machine 20 can be used in decision-making and pattern recognition in the stock market or in politics, in automatic piloting of vehicles and in production networks within a company, for example by means of simulation. Semantic network machine 20 can be applied in the medical field for managing supply networks of hospitals or clinics and for managing the communication between physicians and patients. For example, semantic network machine 20 can analyze information from a plurality of monitoring devices at the homes of patients that are linked through a computer to a physician's computer. Semantic network machine 20 can be used in on-line monitoring of patients in an intensive care unit or in the operating room.

Another embodiment of the present invention can be used to manage supply or disposal networks and robot-networked and agent-networked systems. The embodiment can be used to control networking computers or a hardware network inside a computer or to manage on-line help for computer programs. Semantic network machine 20 can be used in facilities management, risk management and to organize learning in a network. Semantic network machine 20 can be used to automate man-machine communications. Semantic network machine 20 can also be applied in the multi-media field or film industry.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A computer-implemented network structure, comprising:
    a memory that stores instructions to create:
        a first node that is a semantic Janus unit, wherein the first node possesses an existing time-variable state;
        a second node containing informational contents; and
        a link between the first node and the second node, wherein the link contains relational contents that describes the relationship between the first node and the second node, wherein the first node carries out operations on the second node and on the link, wherein the existing time-variable state determines which operations are carried out, and wherein a pattern in an image is recognized by carrying out the operations.

2. The computer-implemented network structure of claim 1, further comprising:
    a library of elementary links, wherein the first node, the second node and the link are part of a semantic network machine within the computer-implemented network structure, wherein the computer-implemented network structure has a user, and wherein the user selects the link from the library of elementary links and adds the link to the semantic network machine.

3. The computer-implemented network structure of claim 2, further comprising:
    a semantic view unit, wherein the semantic view unit generates a graphical representation of the recognized pattern and displays the graphical representation to the user.

4. The computer-implemented network structure of claim 1, wherein the operations change the informational contents of the second node.

5. The computer-implemented network structure of claim 1, further comprising:
    a third node containing second informational contents, wherein the time-variable state determines whether the operations are carried out on the second node or on the third node.

6. The computer-implemented network structure of claim 5, wherein one of the operations carried out by the first node is to delete the third node.

7. The computer-implemented network structure of claim 1, wherein the first node, the second node and the link are part of a semantic network machine within the computer-implemented network structure, wherein the time-variable state of the first node reflects the situation in the semantic network machine, and wherein the operations are focused on parts of the semantic network machine based on the situation in the semantic network machine.

8. The computer-implemented network structure of claim 1, wherein The first node monitors nodes within a vicinity to be monitored, wherein the first node performs the operations on nodes within a vicinity to be shaped, and wherein the first node determines a new time-variable state based on the existing time-variable state and on the nodes within the vicinity to be monitored.

9. The computer-implemented network structure of claim 8, wherein a plurality of nodes is linked to The first node, and wherein the vicinity to be monitored encompasses a subset of the plurality of nodes.

10. The computer-implemented network structure of claim 1, wherein one of the operations carried out by the first node is to create a third node and to link the third node to the second node.

11. The computer-implemented network structure of claim 1, wherein the second node represents a graphic object, and wherein the informational contents contained in the second node are digital pixels of a portion of the image.

12. The computer-implemented network structure of claim 11, wherein the first node, the second node and the link are part of a semantic network machine within the computer-implemented network structure, wherein the graphic object has a shape and a color, and wherein the semantic network machine changes the shape and the color based on the existing time-variable state of the first node.

13. The computer-implemented network structure of claim 1, wherein the computer-implemented network structure has a user, and wherein the user interactively changes the time-variable state of the first node.

14. The computer-implemented network structure of claim 1, wherein the recognized pattern is taken from the group consisting of: a road, a river, a railroad track, an electricity line, a blood vessel, a ligament, and an urban area.

15. A method comprising:
linking a first node that is a semantic Janus unit of a computer-implemented network structure to a second node of the computer-implemented network structure using a first link, wherein the first node, the second node and the first link are parts of a semantic network machine, wherein the first node possesses a state that varies with time, and wherein the second node contains informational contents;
generating changed informational contents by carrying out computational operations on the informational contents based on the state of the first node;
storing the changed informational contents in the second node;
adding a third node to the semantic network machine;
changing the first link to link the first node to the third node, wherein the changed informational contents and the changing the first link to link the first node to the third node are used to recognize a pattern; and
generating an image that includes the recognized pattern.

16. The method of claim 15, further comprising:
deleting the second node.

17. The method of claim 15, wherein the image depicts a traffic network, and wherein the informational contents are digital pixels of a portion of the image, and wherein the recognized pattern is a portion of the traffic network.

18. The method of claim 17, wherein the semantic network machine generates a transportation infrastructure map using the recognized pattern of the traffic network.

19. The method of claim 15, further comprising:
searching for unusual changes in the informational contents.

20. A computer memory comprising program instructions for performing the steps of:
linking a first node that is a semantic Janus unit of a computer-implemented network structure to a second node of the computer-implemented network structure using a first link, wherein the first node, the second node and the first link are parts of a semantic network machine, wherein the first node possesses a state that varies with time, and wherein data is stored in the second node;
generating changed data by carrying out computational operations on the data based on the state of the first node;
storing the changed data in the second node;
adding a third node to the semantic network machine;
changing the first link to link the first node to the third node, wherein the changed data and the changing the first link to link the first node to the third node are used to recognize a pattern; and
generating an image that includes the recognized pattern.

21. The computer memory of claim 20, wherein the recognized pattern is taken from the group consisting of: a road, a river, a railroad track, an electricity line, a blood vessel, a ligament, and an urban area.

22. The computer memory of claim 20, further comprising program instructions for performing the step of:
changing an attribute of the image that includes the recognized pattern, wherein the attribute is taken from the group consisting of: a shape, a texture, a color and a contrast.

23. A semantic network machine, comprising:
a plurality of nodes in a computer-implemented network structure;
a link that links a first one that is a semantic Janus unit of the plurality of nodes to a second one of the plurality of nodes, wherein the second one of the plurality of nodes contains informational contents, and wherein the informational contents includes pixels of a digital image; and
means for recognizing a pattern in the digital image by performing an operation only on a subset of the plurality of nodes based on a state of the semantic network machine.

24. The computer-implemented network structure of claim 23, wherein the means possesses a state, and wherein the state of the semantic network machine is dependent on the state of the means.

25. The computer-implemented network structure of claim 24, wherein the means monitors nodes within a vicinity of the means, and wherein the state of The means is dependent on the nodes within the vicinity.

26. The computer-implemented network structure of claim 23, wherein the operation is performed on the informational contents.

27. The computer-implemented network structure of claim 23, wherein each of the plurality of nodes contains informational contents, and wherein the operation is changing the informational contents of each of the subset of the plurality of nodes.

* * * * *

UNITED STATES PATENT AND TRADEMARK OFFICE
CERTIFICATE OF CORRECTION

PATENT NO. : 7,523,079 B2
APPLICATION NO. : 11/414000
DATED : April 21, 2009
INVENTOR(S) : Athelogou et al.

It is certified that error appears in the above-identified patent and that said Letters Patent is hereby corrected as shown below:

Column 14, line 65, the words "to The first node" should be changed to --to the first node--.

Column 16, line 39, the words "computer-implemented network structure" should be changed to --semantic network machine--.

Column 16, line 39 should now read:

24. The semantic network machine of claim 23, wherein

Column 16, line 43, the words "computer-implemented network structure" should be changed to --semantic network machine--.

The text of column 16, line 43 should now read:

25. The semantic network machine of claim 24, wherein

Column 16, line 45, the words "of The means" should be changed to --of the means--.

Column 16, line 47, the words "computer-implemented network structure" should be changed to --semantic network machine--.

The text of column 16, line 47 should now read:

26. The semantic network machine of claim 23, wherein

UNITED STATES PATENT AND TRADEMARK OFFICE
CERTIFICATE OF CORRECTION

PATENT NO.      : 7,523,079 B2
APPLICATION NO. : 11/414000
DATED           : April 21, 2009
INVENTOR(S)     : Athelogou et al.

It is certified that error appears in the above-identified patent and that said Letters Patent is hereby corrected as shown below:

Column 16, line 50, the words "computer-implemented network structure" should be changed to --semantic network machine--.

The text of column 16, line 50 should now read:

27. The semantic network machine of claim 23, wherein

Signed and Sealed this

Second Day of June, 2009

JOHN DOLL
*Acting Director of the United States Patent and Trademark Office*